United States Patent [19]
Kawai

[11] Patent Number: 5,748,401
[45] Date of Patent: May 5, 1998

[54] SECTOR SERVO SYSTEM DATA RECORDING/REPRODUCING APPARATUS WITHOUT ID PORTION

[75] Inventor: Yasumasa Kawai, Tokyo, Japan

[73] Assignee: Kabushiki Kaisha Toshiba, Kanagawa-ken, Japan

[21] Appl. No.: 529,870

[22] Filed: Sep. 18, 1995

[30] Foreign Application Priority Data

Jan. 31, 1995  [JP]  Japan .................................. 7-014495

[51] Int. Cl.$^6$ .................................................. G11B 5/596
[52] U.S. Cl. .................................. 360/78.14; 360/78.04; 360/77.08
[58] Field of Search ........................... 360/78.14, 48, 360/72.2, 77.08, 78.04; 369/32

[56] References Cited

U.S. PATENT DOCUMENTS

| | | | |
|---|---|---|---|
| 3,701,130 | 10/1972 | Ault | 360/78.14 X |
| 4,001,883 | 1/1977 | Stvout | 360/48 |
| 5,068,755 | 11/1991 | Hamilton | 360/72.2 X |
| 5,172,381 | 12/1992 | Karp | 360/48 X |
| 5,313,340 | 5/1994 | Takayama | 360/48 |
| 5,499,232 | 3/1996 | Hardwick | 360/77.08 X |
| 5,500,848 | 3/1996 | Best | 360/48 X |
| 5,502,699 | 3/1996 | Yamasaki et al. | 360/48 X |
| 5,526,211 | 6/1996 | Hetzler | 360/48 X |

FOREIGN PATENT DOCUMENTS

| | | |
|---|---|---|
| 3-216866 | 9/1991 | Japan . |
| 5-174498 | 7/1993 | Japan . |

*Primary Examiner*—Aristotelis M. Psitos
*Assistant Examiner*—Alan Faber
*Attorney, Agent, or Firm*—Limbach & Limbach LLP; Ronald L. Yin

[57] ABSTRACT

A table containing a servo sector number of the servo sector which includes the data sector, and the ordinal of the data sector at which the data sector is disposed in the servo sector is used to locate a data sector. A control firmware is used to obtain, from the table, the servo sector number of the servo sector including a target data sector and the target data sector number indicating the ordinal at which the target data sector is disposed in the target data sector. The parameters are respectively set in the target servo data sector number register and the target data sector number register. The servo sector number read from servo information previously recorded on the disk is set in the detected servo sector number register. The target servo sector number is compared with the detected servo sector number. If these numbers are equal to each other, the counter is enabled and counts up data sector pulses. When the counter value becomes equal to the target data sector number register value, it is determined that the target data sector is detected, and the sequencer is started, to execute reading/writing.

10 Claims, 9 Drawing Sheets

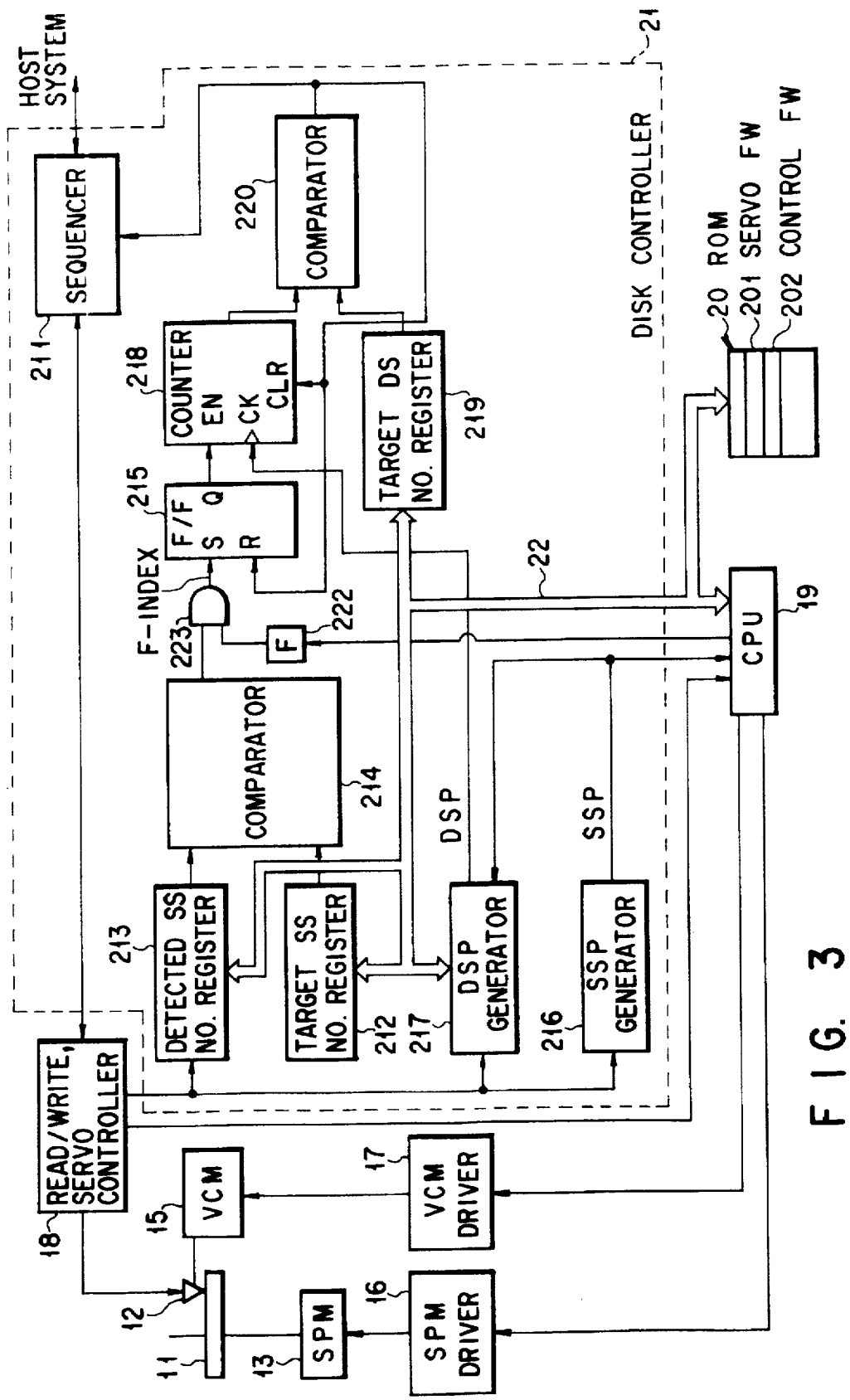
F I G. 3

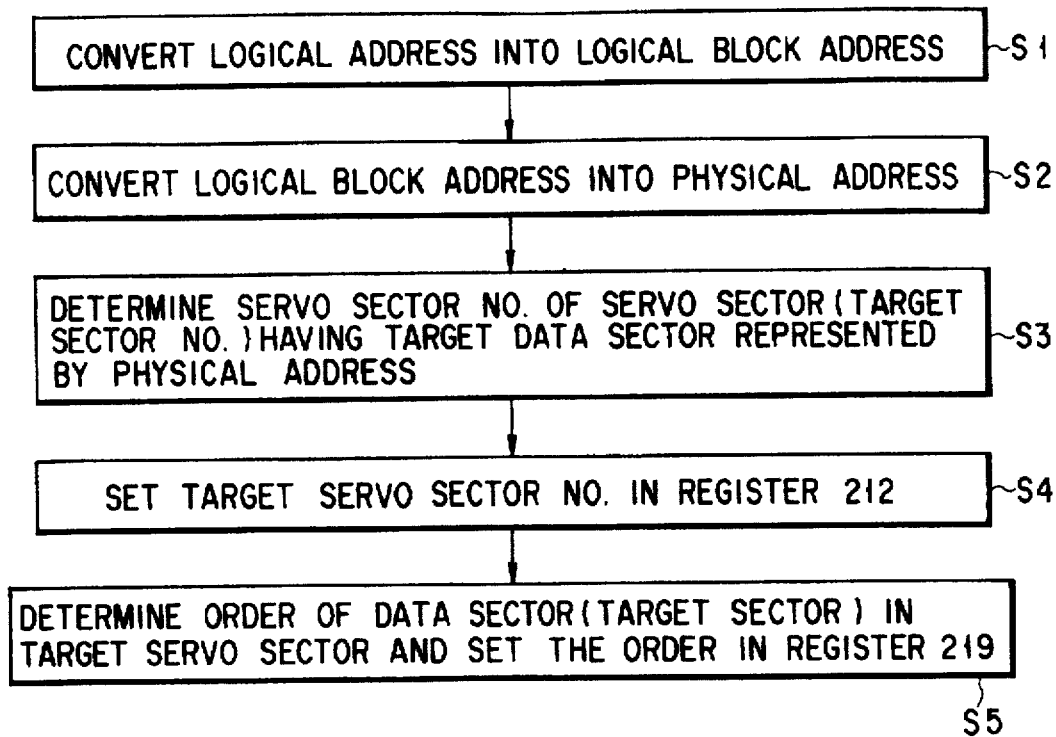
F I G. 6
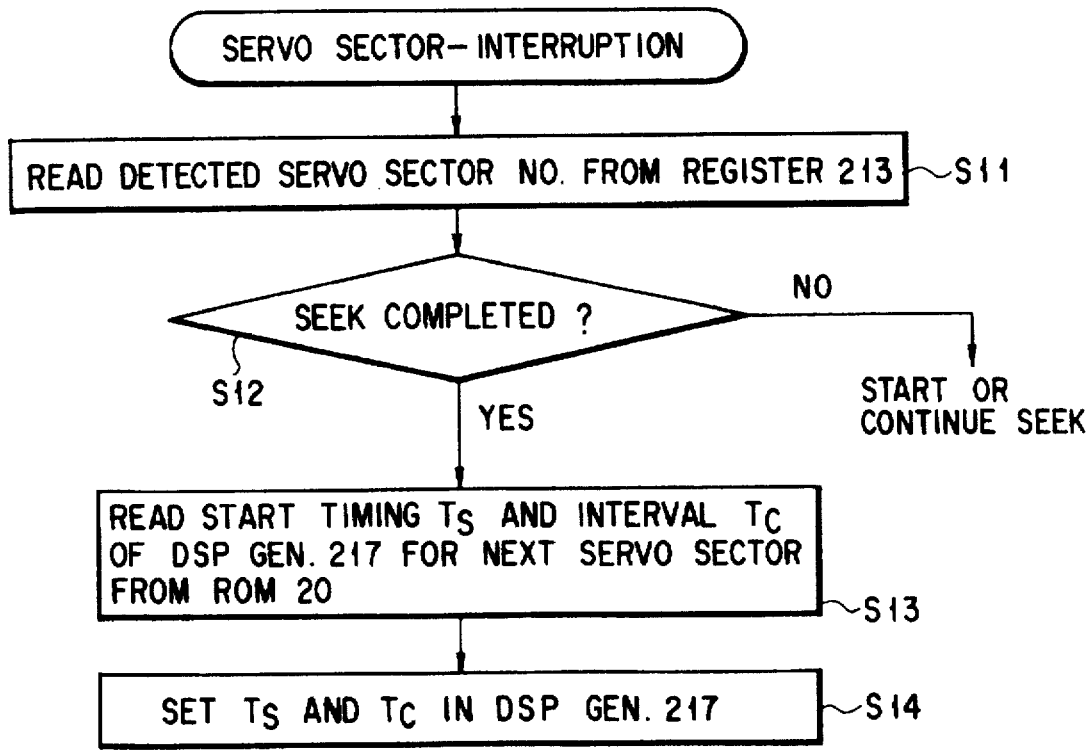
F I G. 7

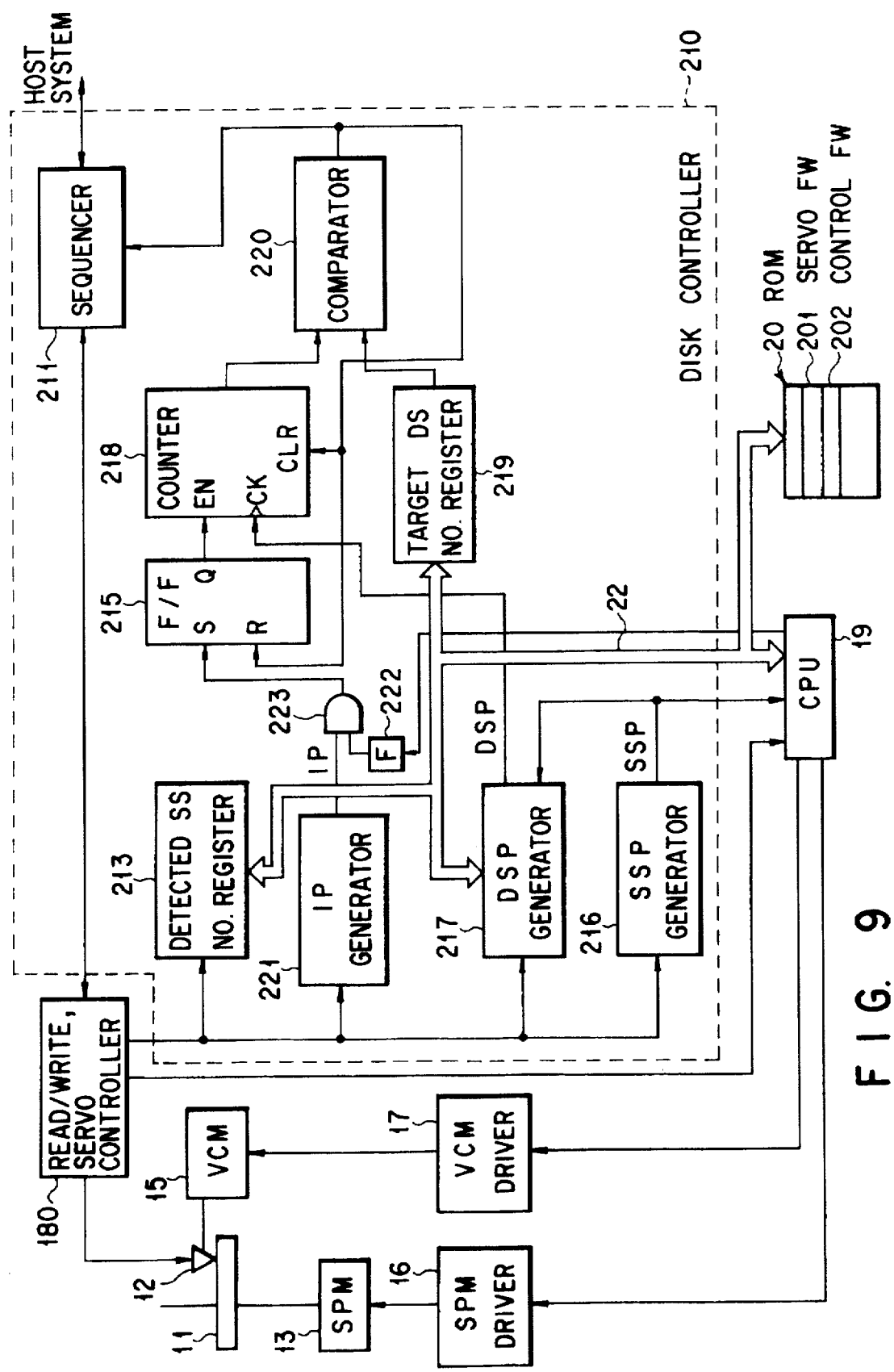
F I G. 9

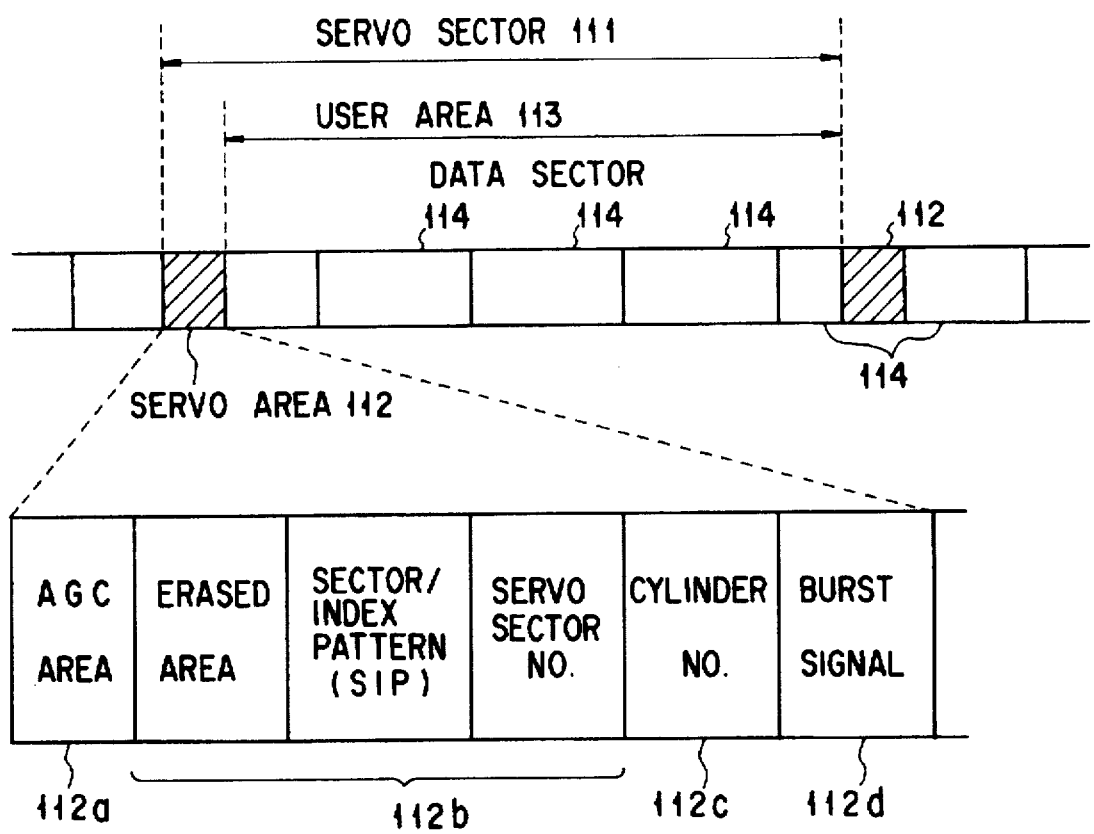
F I G. 10

SECTOR SERVO SYSTEM DATA RECORDING/REPRODUCING APPARATUS WITHOUT ID PORTION

BACKGROUND OF THE INVENTION

1. Field of the Invention

The present invention relates to a data recording/reproducing apparatus using a sector servo method, for use in a hard-disk apparatus or the like, and particularly, to a data recording/reproducing apparatus of an ID-less method including no ID-section (identification section) on a recording medium.

2. Description of the Related Art

FIG. 1 shows a structure of a magnetic disk used in a hard-disk apparatus which adopts a sector servo method and also a CDR (constant density recording) method. In this apparatus, a number of concentric tracks are formed, and a plurality of servo areas 112 are formed radially at equal intervals, crossing the tracks. Note that FIG. 1 illustrates the servo areas 112 as extending linearly to simplify the figure, but these servo areas are more or less skewed in view of matching with the trace of a head. Detailed explanation will be made later with reference to FIG. 4.

Each track is radially divided into a plurality of zones (e.g., three zones Z1 to Z3 in this case). Although omitted from FIG. 1, several tens to hundreds tracks are included in each of the zones. Note that, where the hard-disk apparatus comprises a plurality of disks, corresponding tracks in each zones are called cylinders.

The other area than servo areas 112 is called a user area 113. The servo area 112 and the user area 113 connected thereto constitute a servo sector 111. On the other hand, a user area 113 of each track is divided into data sectors 114. Specifically, data supplied from a host system is divided into data items each having a predetermined data amount, which are respectively recorded into data sectors. Meanwhile, a CDR adopts a data structure in which a circumferential length of a cylinder is supposed, and the recording density with respect to the circumferential length is substantially constant. This means that the number of data sectors in one track differs between respective zones. For example, the outermost zone Z1 consists of data sectors 114 assigned to data sector numbers 0 to 9, the innermost zone Z3 consists of data sectors 114 assigned to data sector numbers 0 to 5, and the middle zone Z2 consists of data sectors 114 assigned to data sector numbers 0 to 7. The CDR method adopts a different data transfer rate for each zone.

FIG. 2A shows a structure of tracks viewed from the side of a head where the disk is rotated in the clockwise direction. As shown in FIG. 1, the servo area 112 is recorded radially at equal intervals over tracks. Therefore, in some cases, the boundary of a data sector is not equivalent to the boundary of a servo sector. In those cases, a part (i.e., the first half part) of a data sector 114 is provided at the last portion of the user area 113 of a servo sector 111 (i.e., at a portion immediately before a servo area 112 of a following servo sector 111), and a part (i.e., the last half part) of the remaining portion in the data sector 114 is provided at the leading end portion of (i.e., at a portion immediately after the servo area 112 of the following servo sector 111).

Servo data containing a servo sector pulse generation specific pattern and head positioning information is previously recorded in a servo area SA. The servo sector pulse generation specific pattern is used to generate a servo sector pulse (SSP) expressing a timing for detecting the leading end of (a servo sector SS containing) a servo area SA.

As shown in FIG. 2B, a data sector DS is roughly divided into an ID portion where information for identifying the data sector DS (comprising a cylinder number, a head number, and a sector number), and a data portion where data (i.e., user data) is recorded.

A data sector pulse (DSP) indicating the leading end position of a data sector is required to record user data from a host system and the likes. In a data recording/reproducing apparatus of a sector servo method, the data sector pulse is generated by using a timer or the like, with a servo sector pulse used as a reference. This method is called a hard sector method.

When a command for executing reading/writing data is issued by a host system, the current position of a head is firstly calculated from servo data recorded in the servo area, and then, seek operation for positioning a head to a target position on a disk is performed. Further, operation for detecting a target sector from data sectors in the track is performed after the seek operation (i.e., positioning operation) is completed. Specifically, as shown in FIG. 2B, a read gate is opened at the timing of a data sector pulse generated by a hard sector method, information (consisting of a cylinder number, a head number, and a sector number) of an ID portion of a corresponding sector is read. Depending on whether or not the information is equal to a target address (i.e., a read/write address), whether or not the data sector is a target data sector is identified. If the data sector is once identified as the target data sector, data read or write operation is started with respect to the data portion of the data sector DS (where the read operation is shown in FIG. 2B). In FIG. 2B, the second data sector in the servo sector is the target data sector.

As described above, in a conventional data recording apparatus using a sector servo method, the head is positioned at a target position in accordance with servo data when reading/writing data. Thereafter, a target data sector is detected by reading the information of the ID portion at the timing of a data sector pulse generated by the hard sector method. However, the ID portion cannot be used to record user data, and reduces the data area which can be used by a user.

In recent years, a disk format including no ID portion in the data sectors has been adopted to improve the high density of data by efficiently using disk areas. However, since this kind of data recording/reproducing apparatus adopts an ID-less method, a target data sector cannot be detected by reading information of the ID portion as described above.

SUMMARY OF THE INVENTION

It is an object of the present invention to provide a data recording/reproducing apparatus in which a target data sector can be easily detected even if an ID portion is not provided in a data sector with use of a sector servo method.

According to the present invention, there is provided a data recording/reproducing apparatus using a disk-like recording medium including a plurality of tracks arranged on concentric circles, a plurality of servo areas radially arranged at equal intervals, and at least one data sector provided in a user area between the servo areas, the servo areas having a servo sector number, the apparatus comprising means for obtaining a target servo sector number of a target servo sector including a data sector from which recording/reproducing is to be started, and a pseudo target data sector number which indicates an ordinal of the data sector in the target servo sector; means for reading the servo sector number from the servo area, and comparing the servo sector number thus read out with the target servo sector number; means for outputting a data sector pulse at a timing of each data sector; and means for counting the data sector pulse after the comparing means has detected equality between the numbers, and starting recording/reproducing when a counted value is equal to the pseudo target data sector number.

According to the present invention, there is provided another data recording/reproducing apparatus using a disk-like recording medium including a plurality of tracks arranged on concentric circles, a plurality of servo areas radially arranged at equal intervals, and at least one data sector provided in a user area between the servo areas, the servo areas having a servo sector number, the apparatus comprising means for outputting an index pulse at a predetermined position of one track; means for obtaining a pseudo target data sector number which indicates an ordinal of a data sector from which recording/reproducing is to be started, counted from the predetermined position; means for outputting a data sector pulse at a timing of a data sector; and means for counting the data sector pulse, and for starting recording/reproducing when a counted value is equal to the pseudo target data sector number.

According to the present invention, there is provided still another data recording/reproducing apparatus using a recording medium in which a number of tracks are formed, each of the tracks being divided into a plurality of servo sectors each including a servo area and a user area, and the user area of one track being divided into a plurality of data sectors, the apparatus comprising first table means for storing a relationship between a physical address of each data sector and a relative address of each data sector using at least one servo area in one track as a reference; second table means for storing a relative position of each data sector for each servo sector, using the servo area as a reference; means for generating at least one reference pulse for every one track, by detecting at least one servo area in one track; means for reading a relative address of a target data sector from the first table means and for keeping a read relative address as a pseudo target data sector number, when a physical address of the target data sector is supplied; means for generating a data sector pulse corresponding to a data sector with reference to the second table means, when detecting each servo area; and means for counting the data sector pulse, comparing a counted value with the pseudo target data sector number, and detecting the target data sector when the counted value is equal to the pseudo target data sector number.

According to the present invention, a target data sector can be easily detected without using an ID portion, thereby enlarging the data area which can be used by a user, and increasing the recording capacitance.

Additional objects and advantages of the present invention will be set forth in the description which follows, and in part will be obvious from the description, or may be learned by practice of the present invention.

The objects and advantages of the present invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 3 is a block diagram showing a first embodiment of the data recording/reproducing apparatus according to the present invention;

FIG. 6 is a flow-chart showing processing procedures according to a control firmware;

FIG. 7 is a flow-chart showing processing procedures according to a servo control firmware;

FIG. 9 is a block diagram showing a second embodiment of the data recording/reproducing apparatus according to the present invention;

FIG. 10 shows the format of a servo sector according to the second embodiment.

DETAILED DESCRIPTION OF THE PREFERRED EMBODIMENTS

A preferred embodiment of a data recording/reproducing apparatus according to the present invention will now be described with reference to the accompanying drawings.

[FIRST EMBODIMENT]

The data recording/reproducing apparatus shown in FIG. 3 is a hard-disk apparatus which adopts a CDR method and includes a magnetic disk 11 and a magnetic head 12 used for writing (recording) data into the disk 11 and reading (reproducing) data from the disk 11. Although this figure illustrates one disk 11, a plurality of disks may be used. In case of using a plurality of disks, a plurality of heads 12 are provided so as to respectively correspond to the disks.

Figure 1:
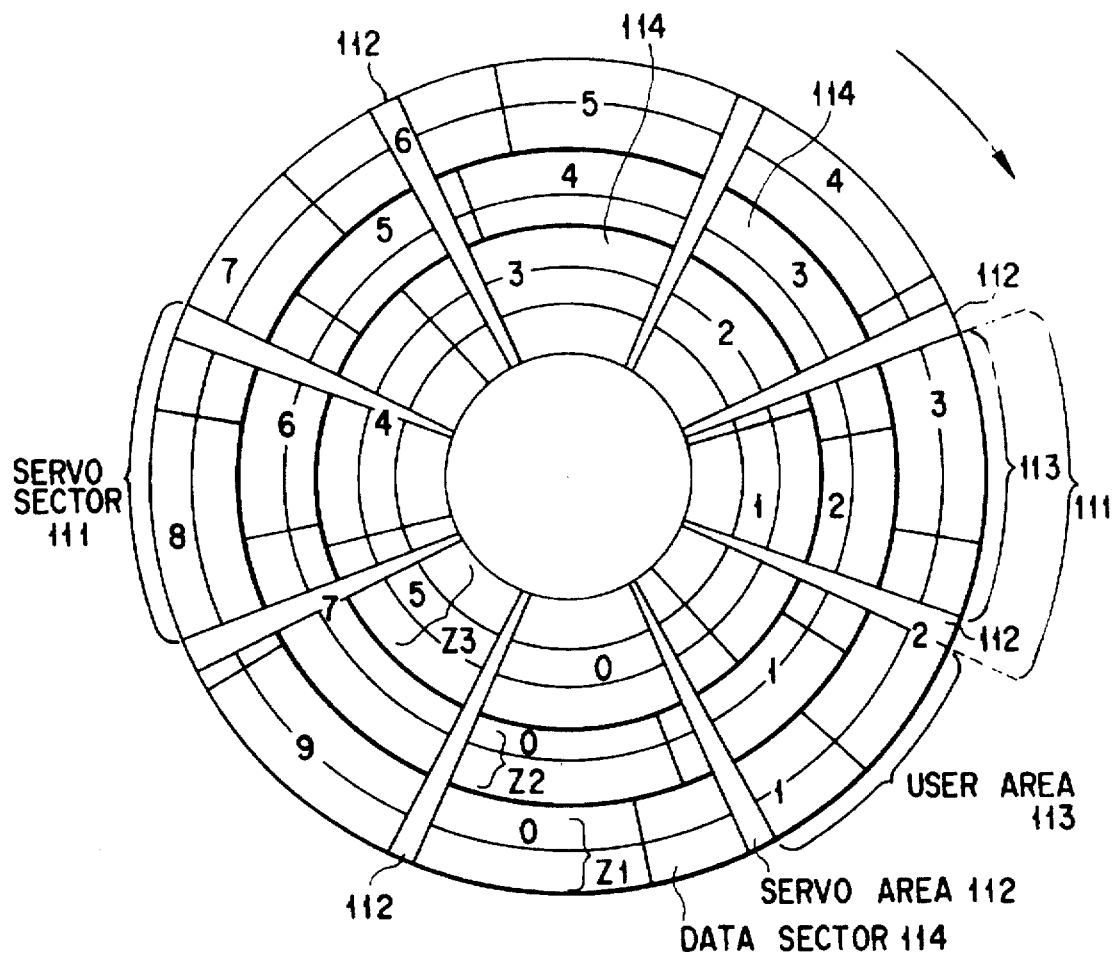
FIG. 1 is a view for explaining a disk format using a CDR method.
Figure 2A:
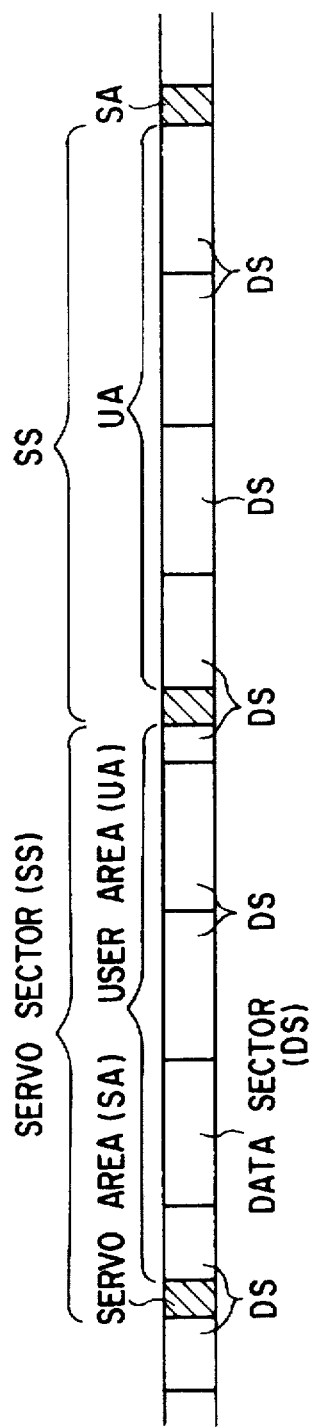
FIG. 2A and 2B show a format of a servo sector shown in FIG. 1.
Figure 2B:
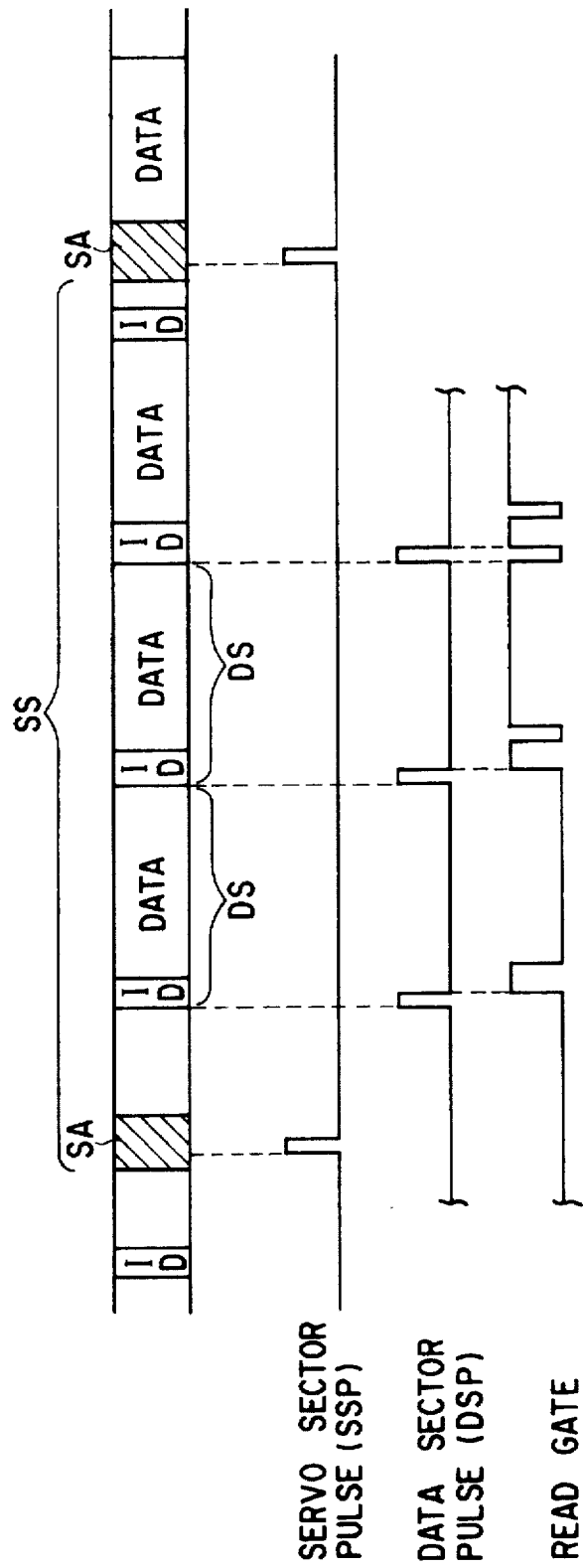
Figure 5:
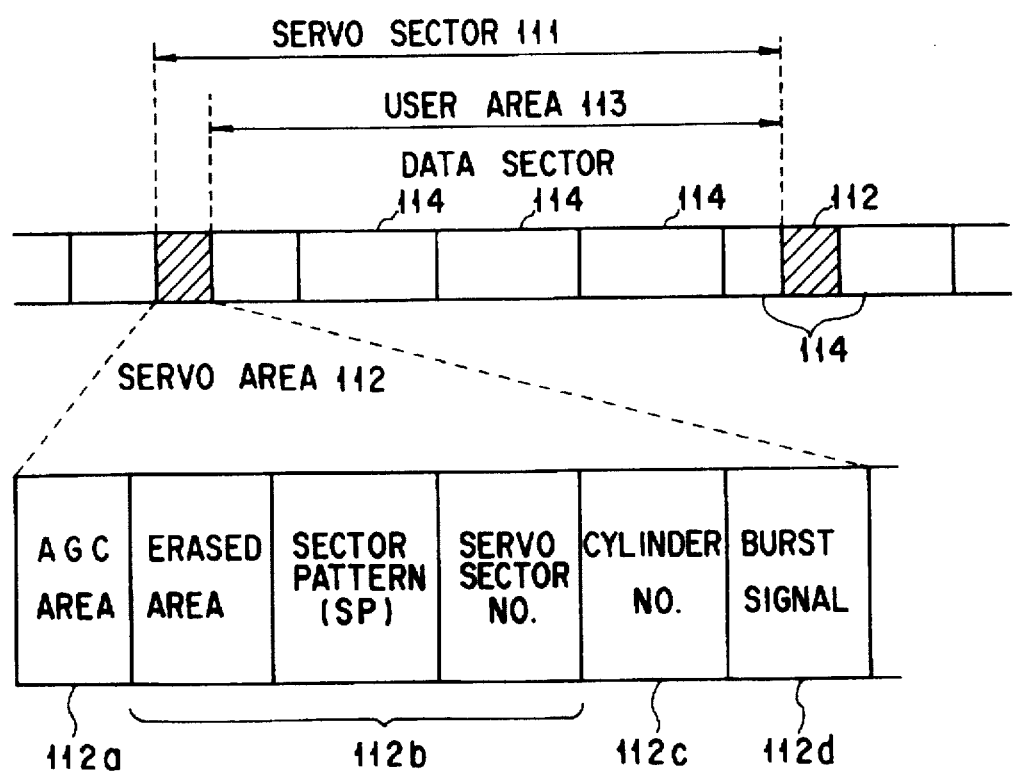
FIG. 5 shows the format of a servo sector according to the first embodiment.

The structure of the disk 11 is schematically shown in FIG. 1. The format of each servo sector according to the present invention is different from that shown in FIG. 2B. In the present invention, the servo sector 111 comprises a servo area 112 and a user area 113 as shown in FIG. 5. The user area 113 consists only of data sectors 114, and is characterized by including no ID portion. Further, the present invention is characterized in that the servo area 112 includes an AGC (automatic gain control) area (or amplitude AGC area) 112a in which data of a predetermined frequency is recorded since the amplitude of a signal is to be stabilized, a sector data area 112b in which data indicating an erased area, a sector pattern, and a servo sector number (SS number) is recorded, a cylinder data area 112c in which cylinder data indicating a cylinder number (or a cylinder address) is recorded, and a burst area 112d in which a burst signal (or burst data) as data indicating positional in formation (or a positional error in a cylinder indicated by a cylinder number) in form of an amplitude of a waveform. A sector pattern is a specific pattern used which indicates a start of data and generates a servo sector pulse.

Figure 4:
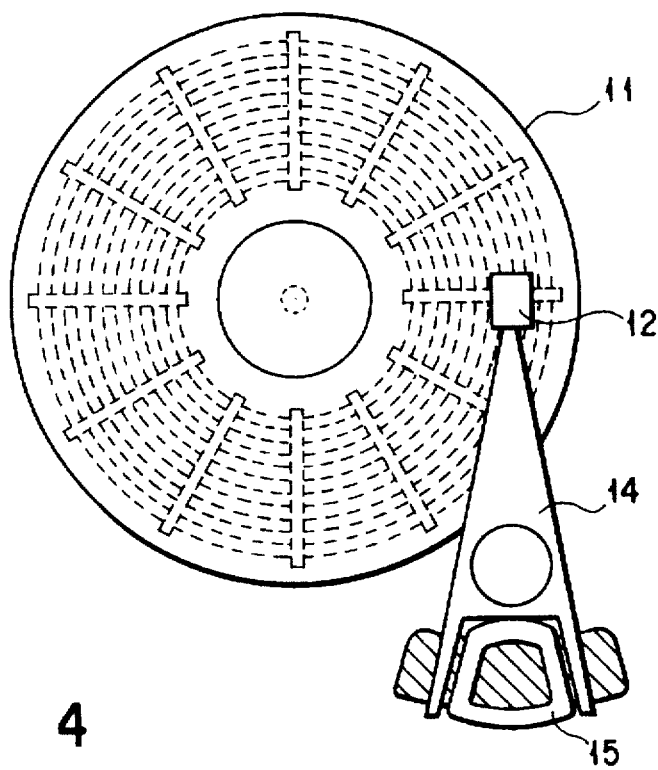
FIG. 4 is shows the details of a head and a carriage shown in FIG. 3.

With reference to FIG. 3, a disk 11 is rotated by a spindle motor (SPM) 13 at a high speed. As shown in FIG. 4, a head 12 is installed in a head move mechanism called a carriage 14, and moves in a radial direction of the disk 11 in accordance with movement of the carriage 14. The carriage 14 is rotated and driven by a voice coil motor (VCM) 15. Therefore, the head 12 traces a circular arc, and the servo area is formed in compliance with the circular arc. The spindle motor 13 is driven by a spindle motor driver 16 and the voice coil motor 15 is driven by a voice coil motor driver 17.

An analog output (or a current signal) read by the head 12 is amplified by a head amplifier not shown, and is then sent to a read/write and servo processor 18. The read/write and servo processor 18 is thus inputted with amplified analog signals (or current signals), and performs signal processing required for data reproducing operation, e.g., signal processing for converting an analog output into NRZ (non return zero) data, as well as signal processing required for data recording operation, e.g., signal processing for modulating NRZ data (or write data) supplied from a disk controller 21 and for converting the modulated data into signals (or write signals) to be written into the disk 11. Further, the read/write and servo processor 18 converts an analog output read by the head 12 into data-pulses (i.e., binarized values), and performs reproduction processing of servo data, i.e., detection (or extraction) of a sector pattern, a servo sector number and a cylinder number from the data-pulses thus obtained. The processor 18 also sample-holds a peak of a burst signal included in the analog output, and sends the peak to a CPU 19.

The CPU 9 performs positioning control for positioning the head 12 at a target cylinder (or track) by using a cylinder number detected by a read/write and servo processor 18 and a peak hold signal of a burst signal, on the basis of a control program stored in the ROM 20. The CPU 19 performs transfer control, by controlling the disk controller 21, in addition to head positioning control.

The ROM 20 previously stores a servo control firmware (or servo FM) 201 which is a control program relating to servo processing (or servo control), and a control firmware (or control FW) 202 which is a control program relating to control of a disk controller 21. Further, although not shown in the figures, the ROM 20 comprises: a first table used for converting a logical block address into a physical address consisting of a physical cylinder address, a physical head address, and a physical sector address; a second table which stores a relationship between a physical address and a servo sector number and a data sector number, and which is used for obtaining a target servo sector number indicating which servo sector includes a data sector (a target data sector) expressed by the physical address, and a target data sector number (or pseudo-target data sector number indicating the ordinal (i.e., the value of the ordinal of a target data sector in the data sector disposition) which the target data sector has in the target servo sector; and a third table which stores parameters (e.g., a start timing ts and a cycle tc) supplying a timing at which a data sector pulse (DSP) generator 217 described later generates a data sector pulse in correspondence with a zone number decided by a servo sector number and a cylinder number.

A disk controller 21 forms an interface between a host system (not shown) and a read/write and servo processor 18, mainly performs transfer of read/write data. Specifically, the disk controller 21 synchronizes a data read timing and a data write timing between the host system and the read/write and servo processor 18, and comprises a sequencer 211 which controls data transfer between the host system and the read/write and servo processor 18.

There are provided a target servo sector (SS) number register 212 in which a target servo sector number is set by the CPU 19 and a detected servo sector number register 213 in which a servo sector number detected by the read/write and servo processor 18 is set. The servo sector numbers as contents of both registers 212 and 213 are compared with each other by a comparator 214. An equal detection signal (or a equal detection pulse) of the comparator 214 passes through an AND gate 223 only when a seek complete flag 222 is set by the CPU 19, and the equal detection signal is supplied as a flex-index (or F-INDEX) to a set terminal of a flip-flop 215. The flip-flop 215 is reset by an output signal outputted when the comparator 220 as will be described later performs equal detection.

Further, there are provided a servo sector pulse generator 216 which generates a servo sector pulse (SSP) in response to detection of a sector patter by the read/write and servo processor 18, and a data sector pulse generator 217 which generates a data sector pulse (DSP) at a start timing ts in a cycle tc determined by the CPU 19, on the basis of a zone corresponding to a servo sector number indicated by the detected servo sector number register 213 and to a cylinder number detected by the read/write and servo processor 18. A servo sector pulse from the servo sector pulse generator 216 is used as an interrupt signal (or a servo sector interruption signal) for the CPU 19.

A Q-output from the flip flop 215 is inputted into an enable terminal of a counter 218, and a data sector pulse outputted from the data sector pulse generator 217 is inputted into a clock input terminal of the counter 218. Specifically, the counter 218 counts the number of data sector pulses generated while the flip-flop 218 is set. In addition, the disk controller 21 includes a target data sector number register 219 in which a value indicating the ordinal of the data sector in a servo sector including the target data sector is set as a pseudo target data sector number (target DS number). The contents (i.e., DS numbers) of the counter 218 and the target data sector number register 219 are compared with each other by a comparator 220, and an equal detection signal thereof is supplied to the sequencer 211 as a starter signal, to the flip-flop 215 as a reset signal, and to the counter 218 as a clear signal.

A target servo sector number register 212, a detected servo sector number register 213, a data sector pulse generator 217, and a target data sector number register 219 are connected to a bus 22 of the CPU 19 together with the ROM 20.

In the next, operation of the first embodiment will be explained. At first, operation of detecting a data sector will be explained with reference to the flow charts shown in FIGS. 6 and 7.

Firstly, it is supposed that a command for executing reading/writing of data has been issued by a host system. This command is applied with a disk address indicating an access destination in form of a cylinder number, a head number, and a data sector number. This disk address uses a logical address (or a logical disk address) so that a disk format and the like specific to a data recording/reproducing apparatus need not be taken care of in the side of the host system (i.e., the user side).

A command issued by the host system is received by the disk controller 21 and is supplied to the CPU 19. The CPU 19 performs processing shown in FIG. 6 in accordance with a control firmware 202 stored in the ROM 20.

In step S1, a logical address consisting of a cylinder number, a head number, and a data sector number applied to a command from the host system is converted into a logical block address. This logical block address is a one-dimensional address in which the data sector having a head number of 0 and a data sector number of 0 in the innermost cylinder of the disk 11 (having a cylinder number of 0) is used as a minimum logical block address (or block number) and in which a data sector having the greatest head number and the greatest sector number in the outermost cylinder of the disk 11 is used as a maximum logical block address (or block number).

In step S2, the logical block address obtained in step S1 is converted into a physical address consisting of a cylinder number, a head number, and a data sector number which comply with the disk format of the CDR and ID-less data recording/reproducing apparatus, with reference to the first table stored in the ROM 20.

In step S3, the servo sector number of the servo sector (i.e., a target servo sector number) having a user area including the data sector (i.e., a target data sector from which data is to be read or into which data is to be written) on the basis of the physical address obtained in step S2 is obtained.

In step S4, the target servo sector number obtained in step S3 is set in the target servo sector number register 212 via the bus 22.

In step S5, information concerning the ordinal of the data sector at which the target data sector obtained in step S4 is disposed in the target servo sector is obtained with reference to the second table stored in the ROM 20. The information is set as a pseudo-target data sector number in the target data sector number register 219 via the bus 22. The processing up to this step is performed in accordance with the control firmware 202.

Next, every time when a sector pattern is detected from data of the servo area 112 read from the disk 11, the read/write and servo processor 18 starts the servo sector pulse generator 216, and the servo sector pulse generator 216 generates one servo sector pulse. In addition, every time when a servo sector number following a sector pattern is detected from a servo area 112b read from the disk 11, the read/write and servo processor 18 sets the detected servo sector number in the detected servo sector number register 213.

Meanwhile, a servo sector pulse from the servo sector pulse generator 216 is inputted as a servo sector interruption pulse into the CPU 19. Every time when the servo sector interruption pulse is inputted into the CPU 19, the CPU 19 performs servo sector interruption as shown in FIG. 7.

In step S11, the detected servo sector number set in the detected servo sector number register 213 is read through the bus 22.

In step S12, whether or not positioning (or seek) of a target cylinder designated by a command supplied from the host system has been completed. If not, well-known positioning control (or seek control) for the positioning is started or continued, on the basis of servo data detected by the read/write and servo processor 18.

If the positioning to the target cylinder has been completed, parameters indicating a start timing ts and the cycle tc in the data sector pulse generator 217 in a next servo sector are read out from the third table in the ROM 20, on the basis of the detected servo sector number and the zone to which the target cylinder belongs, in step S13, and are set in the data sector pulse generator 217 in step S14.

Here, the timing ts represents a time period from the timing of the servo sector pulse equivalent to the leading end position of a corresponding servo sector to the timing of the data sector pulse equivalent to the leading end position of the data sector which is first to appear in the corresponding servo sector. The cycle tc represents a generation cycle of a data sector pulse, i.e., the length of a data sector. Note that in case of not using the CDR method, the timing ts and the cycle tc are determined by a servo sector number next to the detected servo sector number, and are not related with a target cylinder.

The data sector pulse generator 217 is started every time when a servo sector pulse is generated from the servo sector pulse generator 216. At a timing delayed by ts seconds from the time point when the servo sector pulse is generated, a first data sector pulse is generated, and thereafter, following data sector pulses are generated at the cycle of tc.

The comparator 214 compares the target servo sector number set in the target servo sector number register 212, with the detected servo sector number set in the detected servo sector number register 213. If equality is detected between both numbers, for example, an equal detection signal of logic "1" is outputted. Since this equal detection signal is effective only when a target servo sector is detected, the signal is a kind of index pulse F-INDEX.

When an equal detection signal (F-INDEX) of logic "1" is outputted from the comparator 214, the flip-flop 215 is set and the counter 218 is brought into a count enable state.

The counter 218 counts up every time when a data sector pulse is outputted from the data sector pulse generator 217, during the period of the count enable state. Specifically, the counter 218 counts the number of data sector pulses outputted from the data sector pulse generator 217 during the period of the count enable state.

The comparator 220 compares the count value of the counter 218 with the value set in the target data sector number register 219 (i.e., the value indicating the ordinal of the data sector at which the target data sector is disposed in the target servo sector). If both values are equal to each other, the comparator 220 outputs an equal detection signal of logic "1" which indicates that the leading end (or start position) of the target data sector has been detected.

The sequencer 211 is started upon detection of the equality, and simultaneously, the flip-flop 215 is reset while the counter 218 is cleared. Once the sequencer 211 is started, for example, a read gate is opened and read operation is started with respect to a target data sector, in case of a read command.

Figure 8:
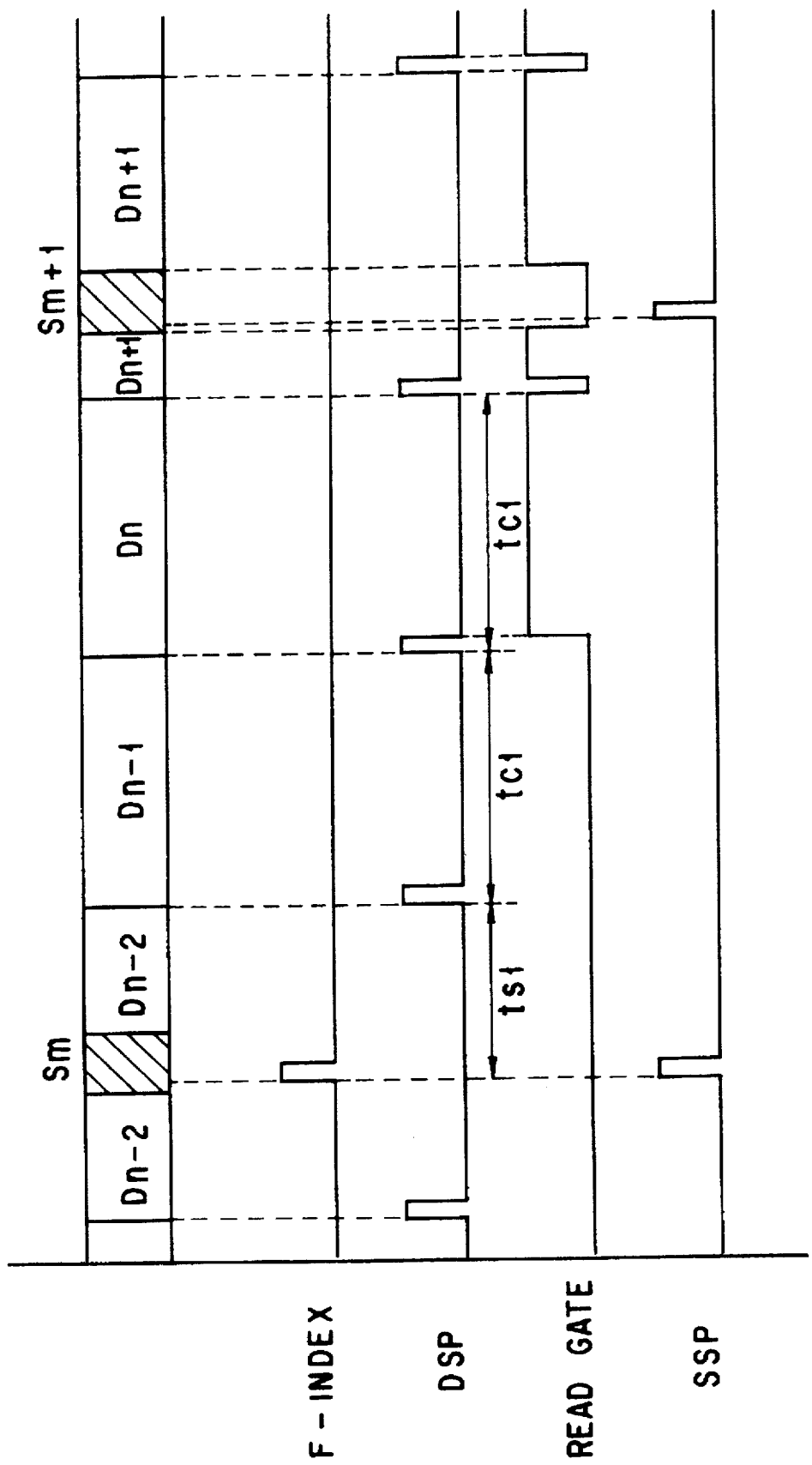
FIG. 8 is a timing-chart for explaining a data sector detecting operation in the first embodiment.

Specific examples of data reading will be explained with reference to a timing chart shown in FIG. 8. Note that references Sm and Sm+1 in FIG. 8 respectively indicate a servo area of a servo sector having servo sector numbers of m and m+1. References Dn−2, Dn−1, Dn, and Dn+1 respectively indicate data sectors having data sector numbers of n−2, n−1, n, and n+1.

Here, it is supposed that a read command has been issued from a host system and positioning to a target cylinder decided by the address applied to the read command has been completed. Where the servo sector number of the target servo sector is m and where the target data sector (which is the second data sector in the target servo sector) is Dn, "m" and "2" are respectively set in the target servo sector number register 212 and the target data sector number register 219.

In this state, the servo sector number m−1 of a servo sector Sm−1 preceding the target servo sector Sm is detected and set in the detected servo sector number register 213, resulting in that ts1 is set as a start timing ts and tc1 is set as a cycle tc in the data sector pulse generator 217 by the data sector pulse generator 217.

In this case, a servo sector next to the servo sector having the servo sector number of m−1, i.e., the target servo sector having the servo sector number of m is detected, and is set in the detected servo sector number register 213. In this stage, an equal detection signal F-INDEX of logic "1" is outputted from the comparator 214, and the flip-flop 215 is set, thereby bringing the counter 218 into a count enable state.

Meanwhile, the data sector pulse generator 217 is started (or restarted) at the time point when the sector pattern SP in the servo data of the target servo sector having a servo sector number "m" is detected and a servo sector pulse is generated. The data sector pulse generator 217 then generates a data sector pulse on the basis of a start timing ts (=ts1) and a cycle tc (=tc1) which are decided by the zone to which the target servo sector having the servo sector number "m" and the target cylinder belong set in response to detection of a preceding servo sector.

The counter 218 counts the data sector pulse from the data sector pulse generator 217 when the target servo sector having the servo sector number "m" is detected as described above. When the count value of the counter 218 reaches "2", i.e., when the counter 218 counts a data sector pulse corresponding to the target data sector Dn which is the second data sector in the target servo sector having the target data sector Dn, equality is detected by the comparator 220 and the sequencer 211 is started. The read gate is opened thereby, and data reading from the data sector line starting from the target data sector Dn is started.

As has been explained above, according to the first embodiment, for each data sector, a table is previously provided which contains two information items, one indicating a servo sector number of the servo sector which includes the data sector, and the other indicating the ordinal of the data sector at which the data sector is disposed in the servo sector. A control firmware 202 is used to obtain two parameters from the table, i.e., the servo sector number of the servo sector including a target data sector with respect to which reading/writing is to be performed and the target data sector number indicating the ordinal at which the target data sector is disposed in the target data sector, (i.e., indicating which DSP counted from the F-INDEX includes the target data sector). Then, the parameters are respectively set in the target servo data sector number register 212 and the target data sector number register 219. The servo sector number read from servo information previously recorded on the disk is set in the detected servo sector number register 213.

The target servo sector number is compared with the detected servo sector number. If these numbers are equal to each other, the flip-flop 215 is set. By this setting, the counter 218 is enabled and counts up data sector pulses. When the counter value becomes equal to the target data sector number register value, it is determined that the target data sector is detected, and the sequencer 211 is started, to execute reading/writing. In this manner, an ID-less method in which no ID portion is provided in the data sector can be realized even with a sector servo method, so that data area can be enlarged by a portion equivalent to such ID portion, and the recording capacity can be increased.

Other embodiments of the data recording/reproducing apparatus according to the present invention will be described. The same portions as those of the first embodiment will be indicated in the same reference numerals and their detailed description will be omitted.

[SECOND EMBODIMENT]

Firstly, the data recording/reproducing apparatus according to the second embodiment shown in FIG. 9 differs from the data recording/reproducing apparatus of FIG. 3 in that each servo area 112 of the disk 11 is provided with a sector data area 1120b shown in FIG. 10, in place of the sector data area 112b shown in FIG. 5. Specifically, the sector data area 1120b is added with a sector/index pattern (SIP), in place of the sector pattern (SP).

There are two kinds of sector/index patterns, i.e., SIP1 and SIP2. One of the two patterns is recorded depending on the sector. The pattern SIP1 is used for generating a servo sector pulse (SP) and an index pulse (IP), while the pattern SIP2 is used for generating a servo sector pulse, like the sector pattern in the first embodiment. For example, the SIP1 is recorded only on the sector data area 1120b in the servo area 112 provided in the servo sector 111 having a servo sector number of "0" (i.e., a predetermined one servo sector 111 on the same cylinder), while the SIP2 is recorded on the sector data area 1120b in the servo area 112 provided in the servo sector 111 other than the servo sector having the servo sector number of "0".

Secondly, the data recording/reproducing apparatus of FIG. 9 is different from the data recording/reproducing apparatus of FIG. 3 in that a read/write and servo processor 180 having a function of detecting a sector/index pattern (SIP1 or SIP2) is used in place of the read/write and servo processor 18, and that a disk controller 210 is used in place of the disk controller 21. This disk controller 210 additionally provided with an index pattern (IP) generator 221 which generates an index pulse when the read/write and servo processor 180 detects a sector index pattern of SIP1, a flag (F) 222 indicating completion of seeking, and an AND gate 223 for outputting an index pulse IP from the IP generator 221 into a set input terminal S of the flip-flop 215 when the flag 222 indicates completion of seeking. The disk controller 210 does not require a target servo sector number register 212 and a comparator 214 shown in FIG. 3. Therefore, the ROM 20 comprises a first table used for converting a logical block address into a physical address consisting of a physical cylinder address, a physical head address, and a physical sector address; a second table which stores a relationship between a physical address and an index pulse, and which is used for obtaining a target data sector number (i.e., a pseudo-target data sector number) indicating the ordinal (i.e., the value indicating an ordinal in disposition of data sectors) of the data sector (i.e., the target data sector) indicated by the physical address, counted from the index pulse; and a third table which stores parameters (e.g., a start timing ts and a cycle tc) supplying a timing at which a data sector pulse (DSP) generator 217 generates a generation timing for a data sector pulse in correspondence with a zone number determined by a servo sector number and a cylinder number.

In the structure of FIG. 9, when a read/write command is issued from the host system, the ordinal of the target data sector in the target cylinder counted from a reference of the servo sector having a servo sector number of "0" is obtained with reference to the second table, unlike in the first embodiment, and is set in the target data sector number register 219. In addition, when positioning (seek) to a target cylinder determined by the address added to a command from the host system is completed, a flag 222 is set by the CPU 19.

Figure 11:
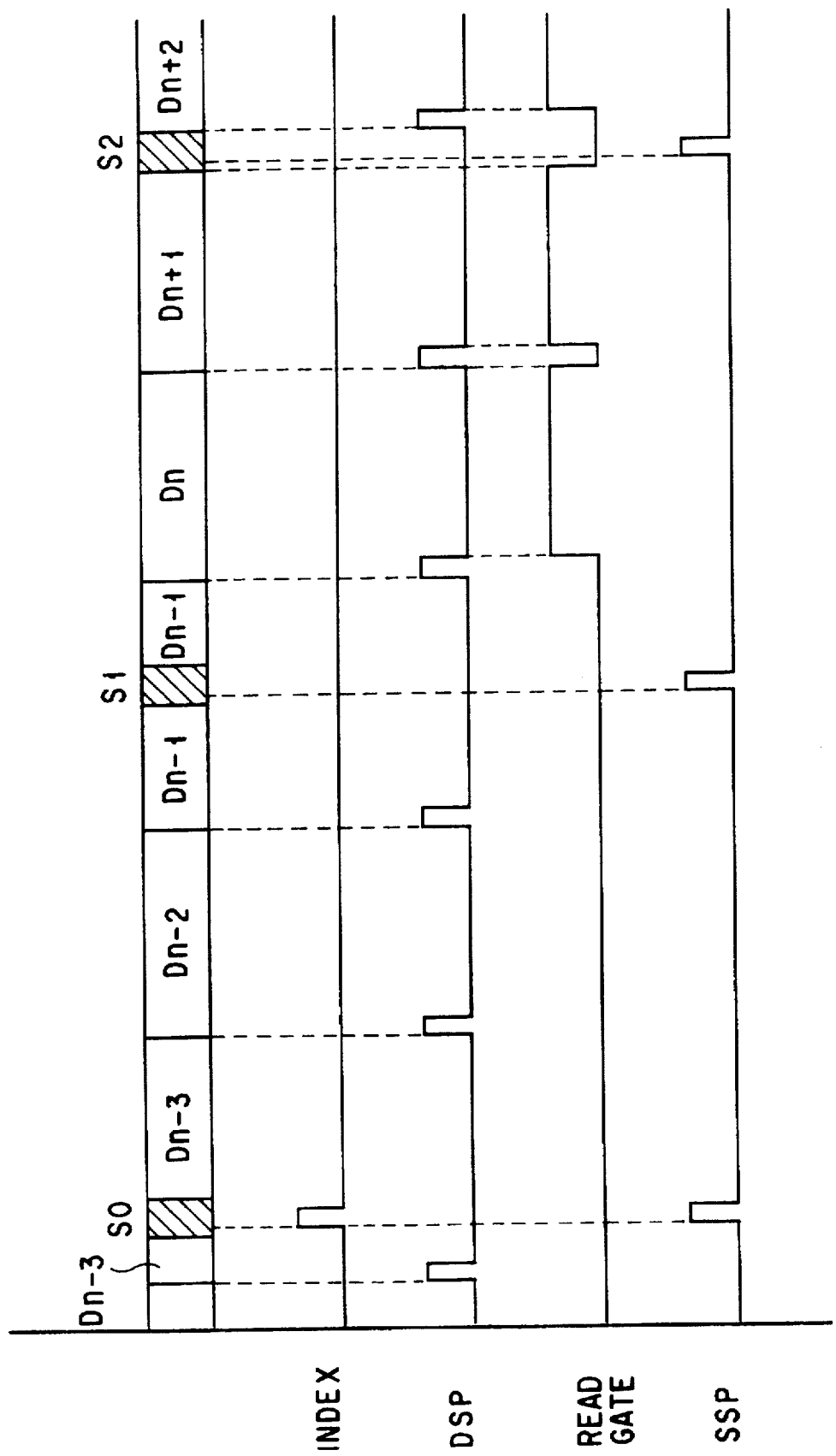
FIG. 11 is a timing-chart for explaining a data sector detecting operation in the first embodiment.

Operation of the second embodiment will now be explained with reference to the timing chart of FIG. 11. Here, it is supposed that a sector/index pattern SIP1 is detected by a read/write and servo processor 180, from servo data recorded on the servo area 112 of a servo sector 111 having a servo sector number of "0" on the target cylinder of the disk 11, in the condition where the seeking has been completed.

Then, one servo sector pulse is generated from the servo sector pulse generator 216, and simultaneously, one index pulse IP is generated from the IP generator 221. Note that no index pulse IP is generated from the IP generator 221 but only one servo sector pulse is generated from the servo sector pulse generator 216, when a sector/index pattern SIP2 is detected from servo data recorded on the servo area 112 of a servo sector 111 having a servo sector number other than "0".

A servo sector pulse from the servo sector pulse generator 216 is inputted as a servo sector interruption pulse into the CPU 19. The CPU 19 performs servo sector interruption processing (FIG. 7) according to the servo control firmware 201 every time when a servo sector pulse is inputted.

Specifically, the CPU 19 reads a detected servo sector number set in the detected servo sector number register 213, via the bus 22, and obtains a start timing ts and a cycle tc in the data sector pulse generator 217 for a next servo sector, on the basis of the detected servo sector number and the zone to which a target cylinder belongs in steps S11 to S13. Then, the CPU 19 sets the start timing ts and the cycle tc in the data sector pulse generator 217 in step S14.

The data sector pulse generator 217 is started every time when a servo sector pulse is generated from the servo sector pulse generator 216, and the generator 217 generates a first data sector pulse at a timing delayed from the time point when the servo sector pulse is generated. Thereafter, this generator 217 generates following data sector pulses at the cycle tc.

Meanwhile, an index pulse generated from the index pulse generator 221 is outputted to a set input terminal S of the flip-flop 215 through the AND gate 223, in a seek completion state in which the flag 222 has been set as described above. Thereby, the flip-flop 215 is set and the counter 218 is brought into a count enable state.

The counter 218 counts up every time when a data sector pulse is outputted from the data sector pulse generator 217, during the period of the count enable state. Specifically, the counter 218 counts the number of data sector pulses outputted from the data sector pulse generator 217 during the period of the count enable state.

The comparator 220 compares the count value of the counter 218 with the value set in the target data sector number register 219 (i.e., the value indicating the ordinal of the data sector at which the target data sector is disposed in the target servo sector). If both values are equal to each other, the comparator 220 outputs an equal detection signal of logic "1" which indicates that the leading end (or start position) of the target data sector has been detected.

Then, the sequencer 211 is started, and simultaneously, the flip-flop 215 is reset while the counter 218 is cleared. Once the sequencer 211 is started, for example, a read gate is opened and read operation is started with respect to a target data sector, in case of a read command.

As has been explained above, according to the second embodiment, an index pulse is generated in a specific one of a plurality of servo sectors provided so as to divide tracks at equal intervals, and a data sector number which indicates the ordinal of a data sector counted from the index pulse is prepared for each sector, in form of a table.

A control firmware 202 is used to obtain a target data sector number indicating the ordinal of a target data sector counted from an index pulse, and to set the ordinal in the target data sector number register 219. Once an index pulse is generated from an index pulse generator 221, the flip-flop 215 is set. Due to this setting, the counter 218 is enabled and counts up data sector pulses. When the counter value becomes equal to the target data sector number register value, it is determined that the target data sector is detected, and the sequencer 211 is started to execute reading/writing. In this manner, an ID-less method in which no ID portion is provided in the data sector can be realized even with a sector servo method, so that data area can be enlarged by a portion equivalent to such ID portion, and the recording capacity can be increased.

As has been explained above, according to the present invention, it is possible to provide a data recording/reproducing apparatus in which a target data sector can easily be detected without providing an ID-portion for each data sector.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, although a magnetic disk has been explained as a recording medium in the above explanation, a recording method is not limited to a magnetic method but may be an opto-magnetical method or the like. It is not necessary to limit the hard-disk type apparatus in which the recording medium cannot be replaced. It is possible to apply the present invention to an apparatus in which the removable recording medium is used. Further, the form of a recording medium is not limited to a disk but may be a card. In addition, the present invention is not limited to a CDR method.

What is claimed is:

1. A data recording/reproducing apparatus using a disk-like recording medium including a plurality of tracks arranged on concentric circles, a plurality of servo areas radially arranged at equal intervals, and plural data sectors provided in a user area between the servo areas, said servo areas having a servo sector number, the apparatus comprising:

means for obtaining a target servo sector number of a target servo sector including a data sector from which recording/reproducing is to be started, and a pseudo target data sector number which indicates an ordinal of the data sector in the target servo sector;

means for reading the servo sector number from the servo area, and comparing the servo sector number thus read out with the target servo sector number;

means for outputting a data sector pulse at a timing of each data sector; and means for counting the data sector pulse after said comparing means has detected equality between the numbers, and starting recording/reproducing when a counted value is equal to the pseudo target data sector number;

wherein said obtaining means comprises a table for storing a target servo sector number and a pseudo target data sector number with respect to a physical address, and obtains the target servo sector number and the pseudo target data sector number, with reference to the table.

2. An apparatus according to claim 1, in which said apparatus is connected to a host system and said obtaining means is supplied with the physical address of the data sector from which recording/reproducing is to be started.

3. A data recording/reproducing apparatus using a disk-like recording medium including a plurality of tracks arranged on concentric circles, a plurality of servo areas radially arranged at equal intervals, and plural data sectors provided in a user area between the servo areas, said servo areas having a servo sector number, the apparatus comprising:

means for obtaining a target servo sector number of a target servo sector including a data sector from which recording/reproducing is to be started, and a pseudo target data sector number which indicates an ordinal of the data sector in the target servo sector;

means for reading the servo sector number from the servo area, and comparing the servo sector number thus read out with the target servo sector number;

means for outputting a data sector pulse at a timing of each data sector; and means for counting the data sector pulse after said comparing means has detected equality between the numbers, and starting recording/reproducing when a counted value is equal to the pseudo target data sector number;

wherein said obtaining means comprises a table for storing a parameter indicating a positional relationship of a data sector with a servo area used as a reference, for each servo sector, and outputs the data sector pulse with reference to the table, in response to detection of a servo area.

4. A data recording/reproducing apparatus using a disklike recording medium including a plurality of tracks arranged on concentric circles, a plurality of servo areas radially arranged at equal intervals, and plural data sectors provided in a user area between the servo areas, said servo areas having a servo sector number, the apparatus comprising:

means for outputting an index pulse at a predetermined position of one track;

means for obtaining a pseudo target data sector number which indicates an ordinal of a data sector from which recording/reproducing is to be started; counted from the predetermined position;

means for outputting a data sector pulse at a timing of a data sector; and means for counting the data sector pulse, and for starting recording/reproducing when a counted value is equal to the pseudo target data sector number;

wherein said obtaining means comprises a table for storing a target servo sector number and a pseudo target data sector number with respect to a physical address, and obtains the target servo sector number and the pseudo target data sector number, with reference to the table.

5. An apparatus according to claim 4, in which said apparatus is connected to host system and said obtaining means is supplied with the physical address of the data sector from which recording/reproducing is to be started.

6. A data recording/reproducing apparatus using a disklike recording medium including a plurality of tracks arranged on concentric circles, a plurality of servo areas radially arranged at equal intervals, and plural data sectors provided in a user area between the servo areas, said servo areas having a servo sector number, the apparatus comprising:

means for outputting an index pulse at a predetermined position of one track;

means for obtaining a pseudo target data sector number which indicates an ordinal of a data sector from which recording/reproducing is to be started; counted from the predetermined position;

means for outputting a data sector pulse at a timing of a data sector; and means for counting the data sector pulse, and for starting recording/reproducing when a counted value is equal to the pseudo target data sector number;

wherein said obtaining means comprises a table for storing a parameter indicating a positional relationship of a data sector with a servo area used as a reference, for each servo sector, and outputs the data sector pulse with reference to the table, in response to detection of a servo area.

7. A data recording/reproducing apparatus using a recording medium in which a number of tracks are formed, each of said tracks being divided into a plurality of servo sectors each including a servo area and a user area, and said user area of one track being divided into a plurality of data sectors, the apparatus comprising:

first table means for storing a relationship between a physical address of each data sector and a relative address of each data sector using at least one servo area in one track as a reference;

second table means for storing a relative position of each data sector for each servo sector, using the servo area as a reference;

means for generating at least one reference pulse for every one track, by detecting at least one servo area in one track;

means for reading a relative address of a target data sector from said first table means and for keeping a read relative address as a pseudo target data sector number, when a physical address of the target data sector is supplied;

means for generating a data sector pulse corresponding to a data sector with reference to said second table means, when detecting each servo area; and means for counting the data sector pulse, comparing a counted value with the pseudo target data sector number, and detecting the target data sector when the counted value is equal to the pseudo target data sector number.

8. An apparatus according to claim 7, wherein said reference pulse generating means generates a reference pulse for each servo sector, and said first table means stores a relationship between a physical address of each data sector and a relative address of each data sector using each servo area as a reference.

9. An apparatus according to claim 7, wherein said reference pulse generate means generates a reference pulse only from a first servo sector of one track, and said first table means stores a relationship between a physical address of each data sector and a relative address of each data sector using the first servo are as a reference.

10. An apparatus according to claim 7, wherein the recording medium is a magnetic disk using a constant density recording method, and has a plurality of concentric tracks and a plurality of radial servo areas formed at equal intervals.

\* \* \* \* \*